No. 710,253. Patented Sept. 30, 1902.
H. W. COOLEY.
BRAKE MECHANISM.
(Application filed Feb. 24, 1902.)
(No Model.) 2 Sheets—Sheet 1.
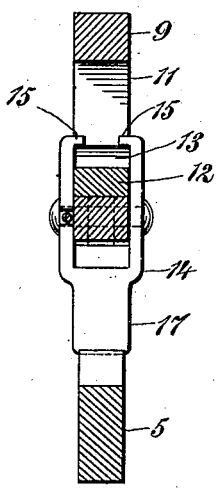
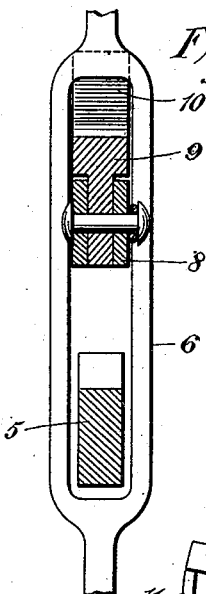
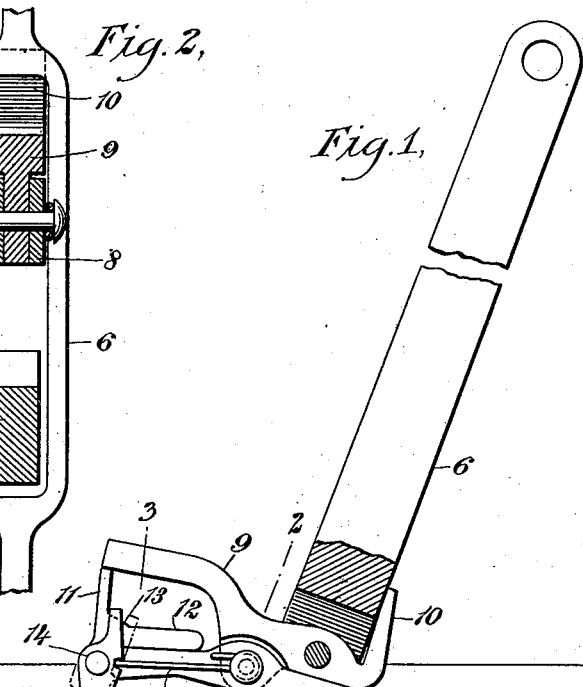
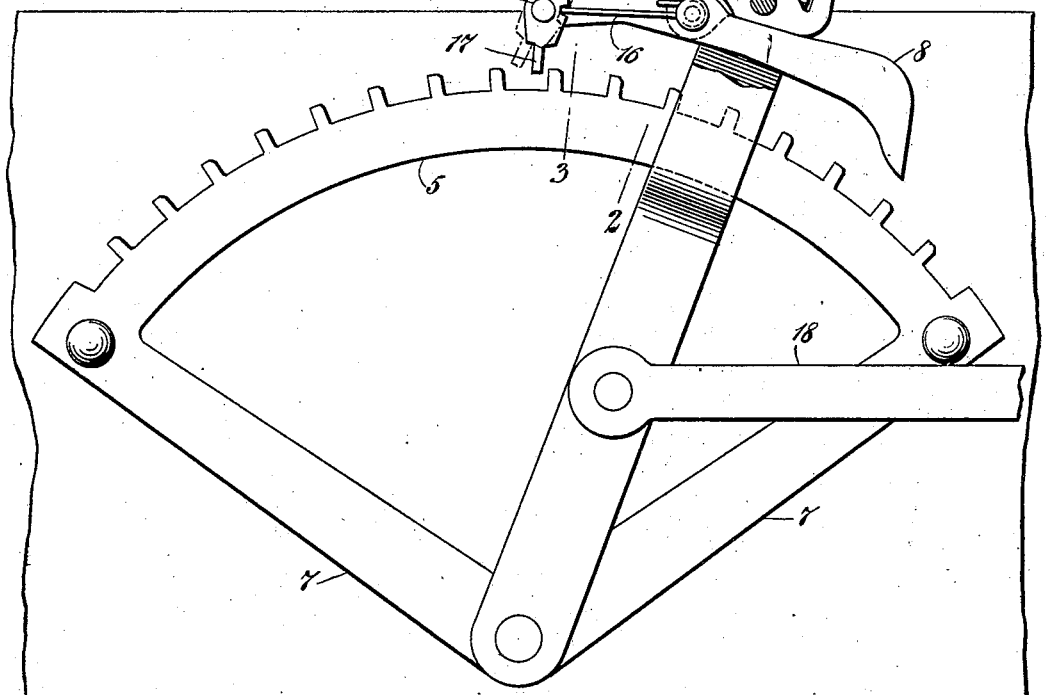
WITNESSES:
Edward Thorpe
C. R. Ferguson
INVENTOR
Harry W. Cooley
BY
ATTORNEYS

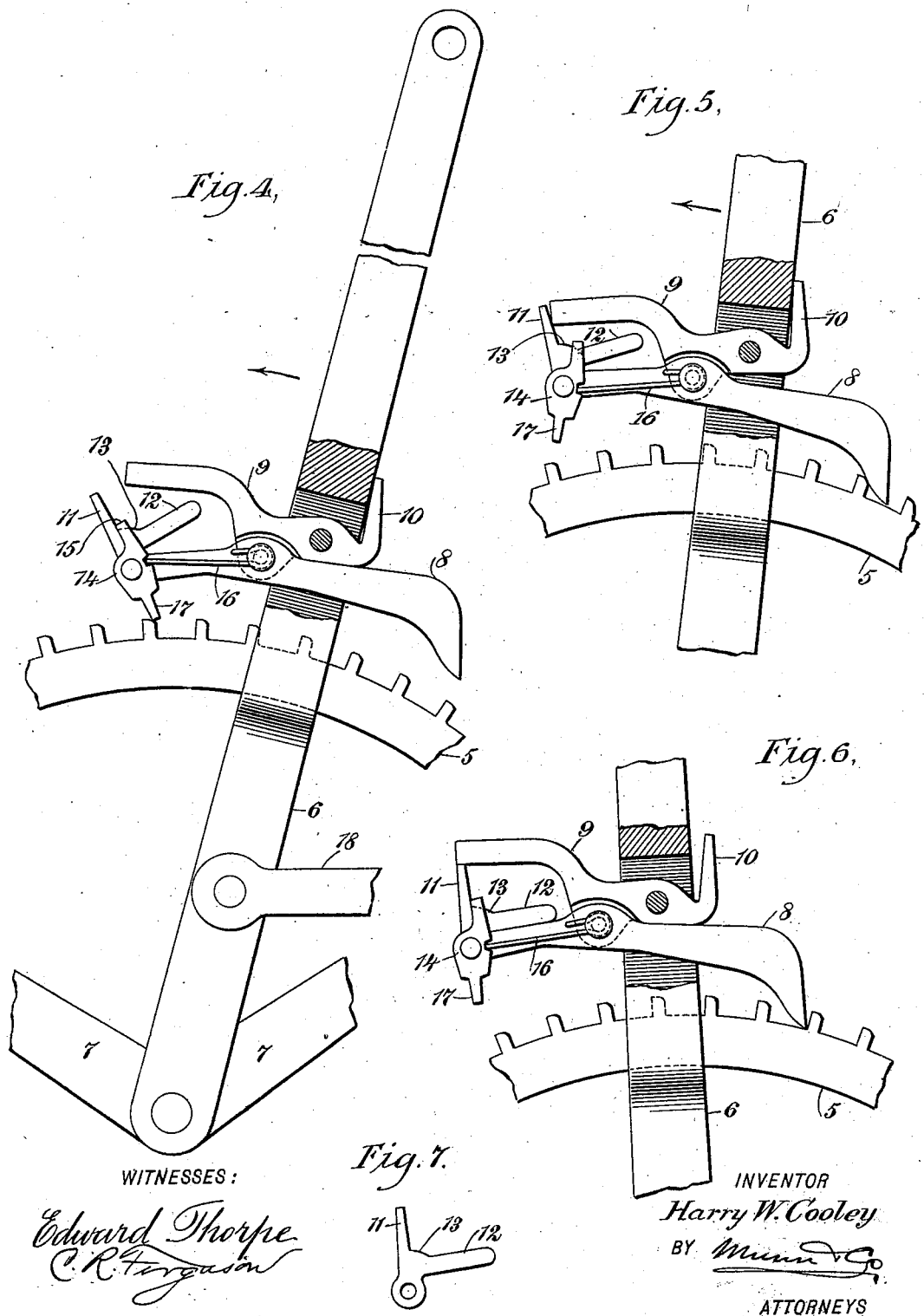

UNITED STATES PATENT OFFICE.

HARRY W. COOLEY, OF LOST VALLEY, OREGON, ASSIGNOR OF ONE-HALF TO HERBERT HALSTEAD, OF LOST VALLEY, OREGON.

BRAKE MECHANISM.

SPECIFICATION forming part of Letters Patent No. 710,253, dated September 30, 1902.

Application filed February 24, 1902. Serial No. 95,271. (No model.)

*To all whom it may concern:*

Be it known that I, HARRY W. COOLEY, a citizen of the United States, and a resident of Lost Valley, in the county of Wheeler and State of Oregon, have invented a new and Improved Brake-Operating Mechanism, of which the following is a full, clear, and exact description.

This invention relates to improvements in operating-levers and holding devices for wagon-brakes; and the object is to provide an operating mechanism that may be manipulated by a person in the vehicle to firmly set and hold the brake or that may be operated to set or release the brake by a person riding on a wheel-horse.

I will describe a brake-operating mechanism embodying my invention and then point out the novel features in the appended claims. Reference is to be had to the accompanying drawings, forming a part of this specification, in which similar characters of reference indicate corresponding parts in all the figures.

Figure 1 is a side elevation, partly in section, of a brake-operating mechanism embodying my invention. Fig. 2 is a section on the line 2 2 of Fig. 1. Fig. 3 is a section on the line 3 3 of Fig. 1. Figs. 4, 5, and 6 show different positions assumed by the parts, and Fig. 7 shows a locking-latch employed.

Referring to the drawings, 5 designates a segment-rack designed to be secured to the side of a wagon, and movable along this rack is the operating-lever 6. Converging braces 7 extend from the ends of the rack, and the lever 6 is pivoted at the junction of these braces. Carried by the lever and adapted to engage with the rack is a dog 8, which is pivoted to a weight-lever 9 forward of the lever 6, this weight-lever being pivoted to the lever 6. It will be noted that both parts 8 and 9 extend through an opening in the lever 6; but they may be arranged at one side thereof. At one end the weight-lever 9 has an upwardly-extended portion 10 for engaging against the rear side of the lever 6.

Pivoted to the forward end of the dog 8 is a locking-latch having an upwardly-extended portion 11 for engaging the under side of the front end of the lever 9 and a rearwardly-extended portion 12, which is designed to engage on the upper side of the dog. At the junction of the parts 11 and 12 there is an upwardly-extended cam-surface 13. Also pivoted to the forward end of the dog 8 is a tripping device 14, which has portions extended upward along the sides of the latch, and the upper ends of these side portions are turned inward, as at 15, for engaging on the upper side of the portion 12 of the latch. The tripping device 14 is held in normal position by means of a spring 16, and its lower end 17 is designed to engage at a certain time with a tooth of the segment-rack. From the lever 6 a draw-rod 18 extends and is designed for engagement with the brake-beam or parts coacting therewith.

The normal position of the parts when the brake is off is indicated in Fig. 1. In the operation to set the brake the lever 6 is to be drawn forward. Then the part 17 of the trip by engaging with a tooth of the rack will force the portion 11 out from underneath the weight-lever 9, as indicated in Fig. 4. The forward end of the dog now being relieved of weight which counterbalances the rear end the said rear end of the dog will fall to engage with the rack and the front end of the lever 9 will fall below the range of movement of the portion 11, as indicated in Fig. 5. Then the lever may be moved forward to tighten and firmly set the brake. The tilting of the latch is permitted by the inwardly-extended portions 15 of the trip being moved off the cam projection 13 of the latch, and when the dog engages with a locking-tooth of the rack and the lever is released the back pressure will tilt the front end of the dog and also the front end of the lever 9 will be raised above the plane of the portion 11, so that the said portion 11, because of the connection between the parts 8 and 9 being forward of the connection between the lever 9 and the lever 6 of the latch, will again swing underneath the weight-lever, as indicated in Fig. 6. When it is desired to release the brake, the lever 6 is to be drawn slightly forward, so that the weight now added to the forward end of the dog will tilt its rack-engaging end away from the rack, as indicated in Fig. 1, so that upon releasing the lever the parts will return to normal position.

Obviously this device may be operated by a person sitting in the wagon, or it may be operated by a person riding a wheel-horse by means of a cord extended from the upper end of the lever to the rider.

The device may be placed on either side of the wagon; but in one case the lever and draw-rod will be at the outer side of the rack, while in the other case the said parts will be between the rack and vehicle-body, the rack being sufficiently spaced from the body in either case.

Having thus described my invention, I claim as new and desire to secure by Letters Patent—

1. A brake-operating mechanism comprising a segment-rack, a lever adapted for connection with a brake, a weight-lever pivoted to the first-named lever, a dog having swinging connection with the weight-lever, a latch pivoted to the forward end of the dog and adapted for engagement with the weight-lever, and a tripping device for moving said latch out of engagement with the weight-lever, substantially as specified.

2. A brake-operating mechanism comprising a segment-rack, an operating-lever, a weight-lever pivoted to the operating-lever, a dog having swinging connection with the weight-lever, a latch pivoted to the forward end of the dog and having an upwardly-extended portion designed to engage with the forward end of the weight-lever, a tripping device pivoted to the forward end of the dog and having a portion for engaging the upper side of the latch, and a projection on said tripping device for engaging with a tooth of the rack, substantially as specified.

3. A brake-operating mechanism, comprising a segment-rack, an operating-lever, a weight-lever having swinging connection with the operating-lever, a dog having swinging connection with the weight-lever, a latch pivoted to the forward end of the dog and having an upwardly-extended portion for engaging underneath the forward end of the weight-lever and a rearwardly-extended portion for engaging on the upper surface of the dog, a tripping device pivoted to the forward end of the dog and having a portion for engaging with the upper side of the rearwardly-extended part of the latch, a spring for holding the tripping device in normal position, and a downward projection on said tripping device for engaging with a tooth of the rack, substantially as specified.

4. A brake-operating mechanism comprising a segment-rack, an operating-lever, a weight-lever having swinging connection therewith and having a rear portion adapted for engagement with the rear side of the operating-lever, a dog pivoted to the weight-lever, a latch pivoted to the forward end of the dog and having an upwardly-extended portion for engaging underneath the forward end of the weight-lever and a horizontally-disposed portion for engaging on the upper side of the dog, a cam projection at the junction of said two portions, a tripping device pivoted to the forward end of the dog and having portions extended along the sides of the latch and portions for engaging on the upper side thereof, and a projection on said tripping device for engaging with a tooth of the rack, substantially as specified.

In testimony whereof I have signed my name to this specification in the presence of two subscribing witnesses.

HARRY W. COOLEY.

Witnesses:
A. A. COX,
HERBERT HALSTEAD.